United States Patent
Martin et al.

(10) Patent No.: US 12,353,733 B2
(45) Date of Patent: Jul. 8, 2025

(54) AUTONOMOUS POWER CONTROL BASED ON SERVICE LEVEL COMPLIANCE

(71) Applicant: Dell Products, L.P., Hopkinton, MA (US)

(72) Inventors: Owen Martin, Hopedale, MA (US); Benjamin A. F. Randolph, Uxbridge, MA (US); Ramesh Doddaiah, Westborough, MA (US)

(73) Assignee: Dell Products, L.P., Hopkinton, MA (US)

( * ) Notice: Subject to any disclaimer, the term of this patent is extended or adjusted under 35 U.S.C. 154(b) by 133 days.

(21) Appl. No.: 18/387,250

(22) Filed: Nov. 6, 2023

(65) Prior Publication Data
US 2025/0147676 A1    May 8, 2025

(51) Int. Cl.
*G06F 3/06* (2006.01)
(52) U.S. Cl.
CPC .......... *G06F 3/0625* (2013.01); *G06F 3/0653* (2013.01); *G06F 3/0679* (2013.01)
(58) Field of Classification Search
CPC .... G06F 3/0625; G06F 3/0653; G06F 3/0679; G06F 1/32; G06F 1/3203; G06F 1/3206; G06F 1/3268; G06F 1/3225; G06F 1/3221; G06F 1/3215
See application file for complete search history.

(56) References Cited

U.S. PATENT DOCUMENTS

| | | | |
|---|---|---|---|
| 7,774,631 B1* | 8/2010 | Walton | G06F 3/0689 713/323 |
| 2017/0269860 A1* | 9/2017 | Geml | G06F 3/0634 |
| 2023/0185456 A1* | 6/2023 | Don | G06F 3/0653 711/111 |
| 2025/0013283 A1* | 1/2025 | Martin | G06F 1/3268 |

* cited by examiner

*Primary Examiner* — Raymond N Phan
(74) *Attorney, Agent, or Firm* — Anderson Gorecki LLP

(57) ABSTRACT

Autonomous power control is provided on a storage system to enable service level maximum response time controls to be achieved, while also minimizing power consumption, by enabling service level minimum response times to be specified and enforced. A workload/CPU clock speed model is created for the storage system correlating a maximum number of IOPS that the storage system can process for different CPU clock speeds for each workload type. A service level agreement specifies a maximum storage system response time. A storage system minimum response time is also specified, that is used to identify a target CPU clock speed for the workload type being provided by a host. The CPU clock speed is lowered to reduce energy consumption by the storage system toward the target CPU clock speed, and storage system performance is monitored to ensure that the storage system complies with the storage system maximum response time.

14 Claims, 7 Drawing Sheets

FIG. 4

| Workload / CPU Clock Speed Model | | | 155 |
|---|---|---|---|
| Workload type #1: On Line Transaction Processing (OLTP) 325 ||||
| CPU clock speed 330 | Max IOPS 335 | Response Time 340 | CPU power consumption (KW) 345 |
| 800Mhz | - | - | - |
| 900Mhz | - | - | - |
| ⋮ | ⋮ | ⋮ | ⋮ |
| 3000Mhz | - | - | - |
| Workload type #2: Decision Support System (DSS) 325 ||||
| CPU clock speed | Max IOPS | Response Time | Power (KW) |
| 800Mhz | - | - | - |
| 900Mhz | - | - | - |
| ⋮ | ⋮ | ⋮ | ⋮ |
| 3000Mhz | - | - | - |
| Workload type #3 | | | 325 |
| ⋮ ||||
| Workload type #N | | | 325 |

CPU clock speed vs. Max IOPS

AUTONOMOUS POWER CONTROL BASED ON SERVICE LEVEL COMPLIANCE

FIELD

This disclosure relates to computing systems and related devices and methods, and, more particularly, to a method and apparatus for enabling autonomous power control based on service level compliance.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

In some embodiments, a method and apparatus for enabling autonomous power control on a storage system is provided, to enable service level maximum response time controls to be achieved, while also minimizing power consumption. In some embodiments, autonomous power control enables specification of both a maximum amount of time the storage system will take to implement Input Output (IO) operations, and a minimum amount of time the storage system will take to implement IO operations. A workload/CPU clock speed model is trained for the storage system, which learns a maximum number of IOPS that the storage system can process for different CPU clock speeds for various workload types. When a storage system minimum response time is specified for a particular workload type, the workload/CPU clock speed model is used to identify a target CPU clock speed, lower than the fastest CPU clock speed, that is expected to enable the storage system to meet both the maximum response time and minimum response time. The CPU clock speed is then lowered to the target CPU clock speed, to reduce energy consumption by the storage system. Storage system performance is then monitored to ensure that the storage system complies with the storage system maximum response time. In instances where the storage system is forecast to be unable to meet its target maximum response time, the CPU clock speed is increased. In instances where the storage system is forecast to be able to process IO operations faster than the storage system maximum response time, the CPU clock speed is decreased toward the target CPU clock speed.

In some embodiments a method of enabling autonomous power control based on service level compliance, includes creating a workload/Central Processing Unit (CPU) clock speed model for a storage system correlating a maximum number of Input/Output Operations per Second (IOPS) the storage system is able to implement for each of a plurality of CPU clock speeds within a CPU clock speed range for each of a plurality of workload types, setting a maximum storage system response time for the storage system based on a service level agreement, and setting a minimum storage system response time for the storage system. The method also includes determining a target maximum CPU clock speed from the workload/CPU clock speed model based on an expected workload type and the minimum storage system response time, and setting a current CPU clock speed of a set of one or more CPUs of the storage system based on the target maximum CPU clock speed. A workload forecast is determined for an upcoming workload interval. The method includes using the workload forecast and current CPU clock speed to determine, from the workload/CPU clock speed model, whether the storage system is expected to comply with the maximum storage system response time during the upcoming workload interval. In response to a determination that the storage system is forecast to exceed the maximum storage system response time during the upcoming workload interval, increasing the current CPU clock speed above the target maximum CPU clock speed for the upcoming workload interval. In response to a determination that the storage system is not forecast to exceed the maximum storage system response time, determining if the current CPU clock speed is faster than the target maximum CPU clock speed, in response to a determination that the current CPU clock speed is faster than the target maximum CPU clock speed decreasing the CPU clock speed toward the target maximum CPU clock speed for the upcoming workload interval.

In some embodiments, in response to a determination that the current CPU clock speed is not faster than the target maximum CPU clock speed, the method includes making no adjustment to the current CPU clock speed for the upcoming workload interval.

In some embodiments, the set of one or more CPUs of the storage system are CPUs that are used to process Input/Output Operations on the storage system.

In some embodiments, the minimum storage system response time is based on a power savings target value for the storage system.

In some embodiments, the workload/Central Processing Unit (CPU) clock speed model is created specifically for the storage system. In some embodiments, creating the workload/Central Processing Unit (CPU) clock speed model includes serially applying a plurality of reference workloads to the storage system, and for each applied reference workload, varying the CPU clock speed to a set of selected CPU clock speeds within a CPU clock speed range, and determining a maximum number of IO operations per second (IOPS) that the storage system can process at each selected CPU clock speed. In some embodiments, the method further includes, for each applied reference workload, measuring an energy consumption by the storage system when the storage system is processing the maximum number of IOPS at each selected CPU clock speed.

In some embodiments a system for enabling autonomous power control based on service level compliance, includes one or more processors and one or more storage devices storing instructions that are operable, when executed by the one or more processors, to cause the one or more processors to perform operations including creating a workload/Central Processing Unit (CPU) clock speed model for a storage system correlating a maximum number of Input/Output Operations per Second (IOPS) the storage system is able to implement for each of a plurality of CPU clock speeds within a CPU clock speed range for each of a plurality of workload types, setting a maximum storage system response time for the storage system based on a service level agreement, and setting a minimum storage system response time for the storage system. The operations also include determining a target maximum CPU clock speed from the workload/CPU clock speed model based on an expected workload type and the minimum storage system response time, and setting a current CPU clock speed of a set of one or more CPUs of the storage system based on the target maximum CPU clock speed. A workload forecast is determined for an upcoming workload interval. The operations include using the workload forecast and current CPU clock speed to determine, from the workload/CPU clock speed model, whether the storage system is expected to comply with the maximum storage system response time during the upcoming workload interval. In response to a determination that the storage system is forecast to exceed the maximum storage system response time during the upcoming workload interval, the operations include increasing the current CPU clock speed above the target maximum CPU clock speed for the upcoming workload interval. In response to a determination that the storage system is not forecast to exceed the maximum storage system response time, the operations include determining if the current CPU clock speed is faster than the target maximum CPU clock speed, in response to a determination that the current CPU clock speed is faster than the target maximum CPU clock speed the operations include decreasing the CPU clock speed toward the target maximum CPU clock speed for the upcoming workload interval.

In some embodiments, in response to a determination that the current CPU clock speed is not faster than the target maximum CPU clock speed, the operations include making no adjustment to the current CPU clock speed for the upcoming workload interval.

In some embodiments, the set of one or more CPUs of the storage system are CPUs that are used to process Input/Output Operations on the storage system.

In some embodiments, the minimum storage system response time is based on a power savings target value for the storage system.

In some embodiments, the workload/Central Processing Unit (CPU) clock speed model is created specifically for the storage system. In some embodiments, creating the workload/Central Processing Unit (CPU) clock speed model includes serially applying a plurality of reference workloads to the storage system, and for each applied reference workload, varying the CPU clock speed to a set of selected CPU clock speeds within a CPU clock speed range, and determining a maximum number of IO operations per second (IOPS) that the storage system can process at each selected CPU clock speed. In some embodiments, the operations include, for each applied reference workload, measuring an energy consumption by the storage system when the storage system is processing the maximum number of IOPS at each selected CPU clock speed.

BRIEF DESCRIPTION OF THE DRAWINGS

FIG. 4 is a block diagram of an a data structure configured to implement an example workload/CPU clock speed model 155, according to some embodiments.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable storage medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

As used here, an "engine" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, an "engine" can refer to a combination of a hardware processing circuit and machine-readable instructions (software and/or firmware) executable on the hardware processing circuit.

Figure 1:
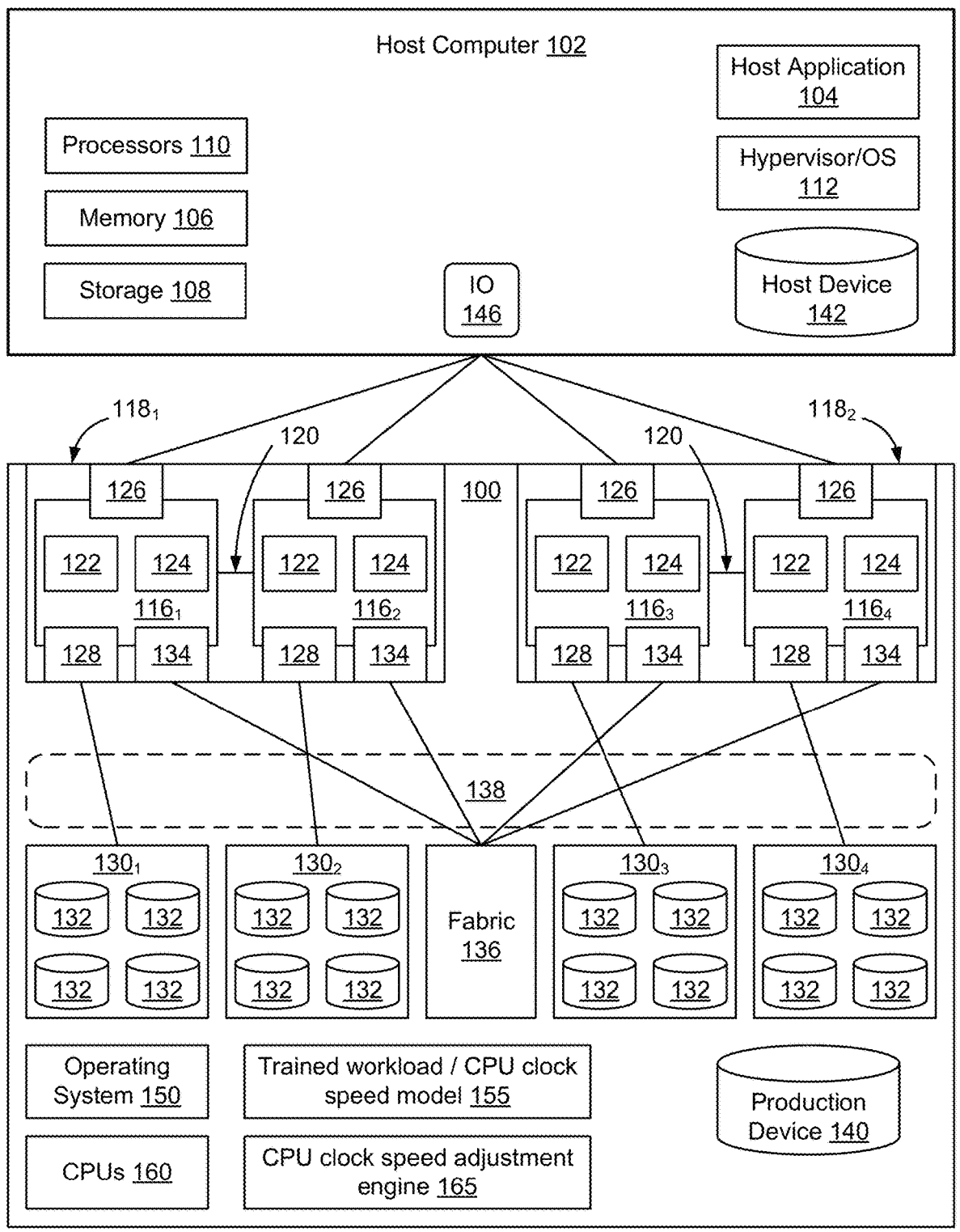
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. In some embodiments, the communication links 120 are implemented as a PCIe NTB. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g., including multiple CPUs, GPUs, and combinations thereof. The local volatile memory 124 may include, for example and without limitation, any type of RAM. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using PCIe (Peripheral Component Interconnect Express) or InfiniBand. Each compute node 116 may allocate a portion or partition of its respective local volatile memory 124 to a virtual shared memory 138 that can be accessed by other compute nodes 116 over the PCIe NTB links.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible, then the IO 146 is sent to one of the compute nodes 116 to be serviced by the storage system 100.

In the case where IO 146 is a read command, the storage system 100 uses metadata to locate the commanded data, e.g., in the virtual shared memory 138 or on managed drives 132. If the commanded data is not in the virtual shared memory 138, then the data is temporarily copied into the virtual shared memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the virtual shared memory 138, marks the data as dirty, and creates new metadata that maps the address of the data on the production device 140 to a location to which the block is written on the managed drives 132.

Storage systems are designed to enable a user to set a maximum response time that the storage system must meet in connection with performing Input Output (IO) operations. The maximum response time may be set, for example, as part of a Service Level Agreement (SLA). For example, a user may specify that the maximum amount of time that a storage system may take to respond to a read IO operation or a write IO operation is 0.75 mSec. The storage system has CPUs and other physical resources that are used to implement the IO operations from the host, and the storage system prioritizes operations with different SLA agreements to ensure that the IO operations from the various hosts are serviced sufficiently quickly to meet the service level agreement maximum response time values.

In some embodiments, the physical resources of the storage system such as CPU resources are configured to always operate at a maximum level, to process IO operations as quickly as possible. The performance demands of business applications can require huge amounts of electricity to sustain. Specifically, storage systems are designed for maximum performance, which may not always be the desired target. For example, some storage systems are used for test and development environments that often are idle or have lower priority. Likewise, some applications were designed to run on legacy storage systems, and may have much lower performance targets than the performance levels that are able to be achieved by current storage systems. In these and other instances, it would be advantageous to enable the performance of the storage system to be downwardly adjusted, to reduce the electrical consumption of the CPUs of the storage system, while continuing to meet any maximum response time requirements set in a respective storage system service level agreement.

According to some embodiments, a workload/CPU clock speed model 155 is trained for a storage system 100 correlating a maximum number of IOPS the storage system can perform for different types of workloads at different CPU clock speeds. Subsequently, when presented with a request to reduce power usage by establishing a minimum response time, the workload/CPU clock speed model 155 is used by CPU clock speed adjustment engine 165 to determine a CPU clock speed that corresponds to a minimum response time for a given workload. The clock speed of the CPUs is then adjusted downward toward the target CPU clock speed to reduce power consumption by the CPUs. By throttling the CPU clock speed of the storage system, it is possible to reduce the amount of power consumed by the CPUs, to thereby reduce the overall power requirements of the storage system 100.

Figure 2:
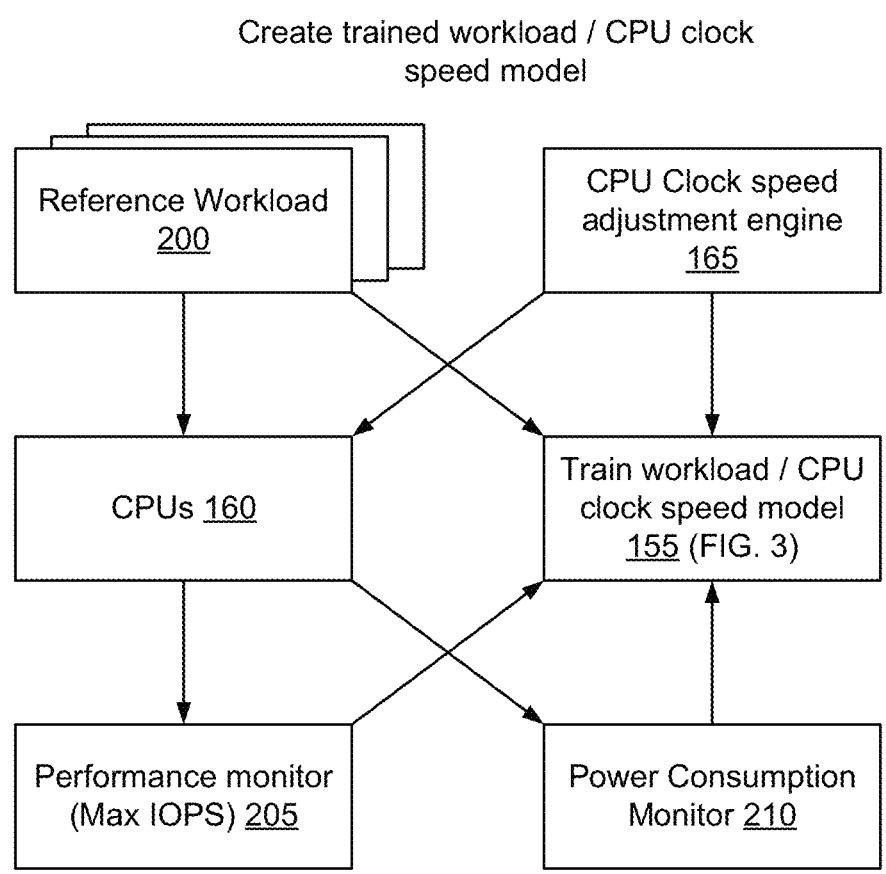
FIG. 2 is a block diagram of an example system for creating a trained workload/CPU clock speed model used in connection with a method and apparatus for enabling autonomous power control based on service level compliance, according to some embodiments.

FIG. 2 is a block diagram of an example system for creating a trained workload/CPU clock speed model 155 used in connection with a method and apparatus for enabling autonomous power control based on service level compliance, according to some embodiments. As shown in FIG. 2, in some embodiments the storage system has a plurality of CPUs 160 that collectively are used to process IO operations (IOs). The clock speed of the CPUs, in some embodiments, is a variable that is able to be set within a range, as specified by the CPU manufacturer. In some embodiments, the CPU clock speed may be set by specifying a multiplier of a base CPU clock speed. For example, a given CPU manufacturer might create a family of CPUs that has a CPU clock speed range of between 800 MHz and 3000 MHz, which can be varied in steps of 100 MHz. The particular CPU clock speed range, including the lower CPU clock speed limit and upper CPU clock speed limit, and the step increment within the CPU clock speed range, will depend on the particular implementation.

Although some embodiments are described that are focused on achieving power savings by dynamically reducing the CPU clock speed, it should be understood that other adjustments may be made to the CPU, in connection with reducing the CPU clock speed, that also are associated with achieving power savings. For example, in some microprocessors the voltage required for stable operation is determined by the frequency at which the circuit is clocked. Specifically, in some microprocessors a higher voltage is required by the CPU if the CPU is run at a higher CPU clock speed, while a lower voltage is required by the CPU if the CPU is run at a lower CPU clock speed. Since the dynamic power dissipated by a CPU depends on both the clock speed and the voltage, in some embodiments reducing the CPU clock speed can also result in a concomitant reduction in voltage, thus additionally contributing to power savings.

As shown in FIG. 2, in some embodiments the system for creating the trained workload includes a CPU clock speed adjustment engine 165. In some embodiments the CPU clock speed adjustment engine 165 is a utility built into the operating system 150, although the particular type of CPU clock speed adjustment engine 165 will depend on the particular implementation.

Different types of IO operations may take different numbers of CPU cycles to process. Example types of IO operations include:
  read hits: read IO operations that are able to be served from data stored in shared global memory 138;
  read misses: read IO operations that are not able to be served from data stored in shared global memory and which therefore require access to back-end storage resources;
  sequential reads: read IO operations on sequential areas of storage;
  write IO: write IO operations; and
  sequential write IOs: write IO operations on sequential areas of storage.
Although several example types of IO operations are listed in this paragraph, it should be understood that there are other types of IO operations as well.

Additionally, different types of workloads contain different ratios of various types of IO operations. For example, a first type of workload may have a larger percentage of read hits, whereas a second type of workload may have a larger percentage of read misses. Since the different types of IO operations may require different numbers of CPU cycles to process, the type of workload being provided to a given set of CPUs will affect the maximum number of IO operations per second (IOPS) that the CPUs can process at a particular selected CPU clock speed.

According to some embodiments, a set of reference workloads 200 are used to train the workload/CPU clock speed model 155 to learn the maximum number of IOPS the storage system can process, of each workload type, at each of a plurality of selected CPU clock speeds within the CPU clock speed range. In embodiments where the CPU clock speed range is adjustable in steps, for example using multipliers of a base clock speed, the workload/CPU clock speed model 155 may be trained to learn the max number of IOPS at each clock speed step, or at a selected number of clock speed steps within the range.

Each reference workload 200 is applied to the CPUs of the storage system and a performance monitor 205 determines a maximum number of IOPS that the storage system can perform at the current CPU clock speed. This value is then recorded as an entry in the workload/CPU clock speed model 155. In some embodiments, a power consumption monitor 210 determines an amount of power used by the CPUs and/or by the storage system as a whole when the storage system is performing the maximum number of IOPS at the selected clock speed. The power consumption is also added to the entry in the workload/CPU clock speed model 155.

Figure 3:
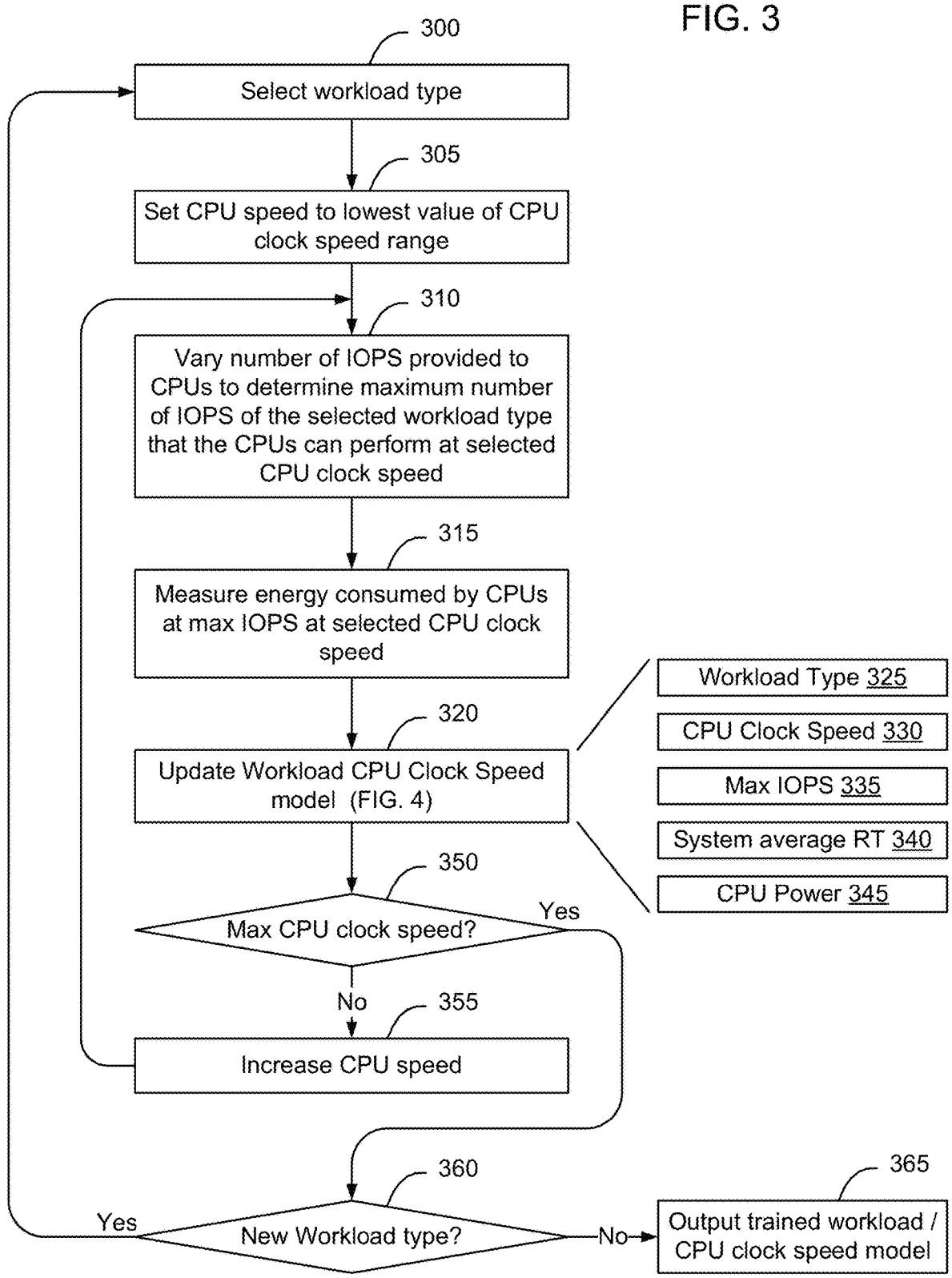
FIG. 3 is a flow chart of an example method of creating a trained workload/CPU clock speed model used in connection with a method and apparatus for enabling autonomous power control based on service level compliance, according to some embodiments.

FIG. 3 is a flow chart of an example method of creating a trained workload/CPU clock speed model 155 used in connection with a method and apparatus for enabling autonomous power control based on service level compliance, according to some embodiments. As shown in FIG. 3, in some embodiments a reference workload type is selected (block 300), and an initial CPU clock speed is selected (block 305). For convenience, FIG. 3 shows the initial CPU clock speed as being set to the lowest possible CPU clock speed (block 305), which is then incremented (block 355). It should be understood that other ways of varying the CPU clock speed may be utilized as well, such as by selecting the highest CPU clock speed at block 305 and then decrementing the CPU clock speed at 355. Random variations of CPU clock speed may also be selected, rather than linearly increasing or decreasing CPU clock speeds, depending on the implementation. In some embodiments, each CPU clock speed step increment is used to train the workload/CPU clock speed model 155. In other embodiments only a selected subset of possible CPU clock speed increments are used to train the workload/CPU clock speed model 155.

Once the workload type and CPU clock speed have been selected, a reference workload 200 of the selected workload type is input to the storage system and the number of IOPS of the reference workload are varied to determine the maximum number of IOPS of the selected workload type that the CPUs of the storage system can perform (block 310). In some embodiments, the amount of power consumed by the storage system when processing the maximum number of IOPS of the workload type at the selected CPU clock speed is also measured (block 315). The values determined in blocks 310 and 315 are then used to update the workload/CPU clock speed model 155 (block 320). For example, in some embodiments each entry of the workload/CPU clock speed model 155 includes an identification of the workload type 325 that was selected in block 300, the CPU clock speed 330 that was selected in block 305, the max IOPS 335 that was determined in block 310, and the amount of power 345 required to process the max IOPS that was determined in block 315.

In some embodiments, as shown in FIG. 3, the entries of the workload/CPU clock speed model 155 also include the system average response time at the maximum IOPS 340. In some embodiments, the system average response time 340 is determined as $1/IOPS_{MAX}$. For example, if the maximum number of IO operations a given storage system is able to process in one second is 2000 ($IOPS_{MAX}$=2000), the average response time is $\frac{1}{2000}$ second=0.0005 seconds, or 0.5 milliseconds.

Once the entry of the workload/CPU clock speed model 155 has been populated, a determination is made as to whether the CPU clock speed should be changed (block 350). For example, in embodiments where the initial CPU clock speed that is selected in block 305 is a low CPU clock speed, a determination may be made at block 350 as to whether the current CPU clock speed is a maximum value. In instances where the CPU clock speed is not the maximum value (a determination of NO at block 350), the CPU clock speed is incremented (increased at block 355) and the process returns to block 310 to determine the maximum number of IOPS for the new CPU clock speed. If a determination is made to not change the CPU clock speed, for example where the CPU clock speed is determined to be at the maximum value (a determination of YES at block 350), a determination is made as to whether there are additional workload types to be evaluated (block 360). In response to a determination that there are additional workload types to be evaluated (a determination of YES at block 360), the process returns to block 300 where a new workload type is selected. In response to a determination that there are no additional workload types to be evaluated (a determination of NO at block 360), the process of training the workload/CPU clock speed model 155 ends and the trained workload/CPU clock speed model 155 is output (block 365).

In FIG. 3, some embodiments are shown in which the CPU clock speed is selected and then a max number of IOPS for a given workload type is determined at the selected CPU clock speed. It should be understood that it is also possible to input a given number of IOPS to a storage system and then vary the CPU clock speed to determine a CPU clock speed required to implement the given IOPS. Accordingly, FIG. 3 is provided as an example of a way of determining entries of an example workload/CPU clock speed model 155, it being understood that there are also other ways of determining the values of entries of the workload/CPU clock speed model 155.

FIG. 4 is a block diagram of an a data structure configured to implement an example workload/CPU clock speed model 155, according to some embodiments. As shown in FIG. 4, in some embodiments the workload/CPU clock speed model 155 includes sets of entries for a plurality of workload types 325. In FIG. 4, two example workload types are shown, including on-line transaction processing and decision support system workload types, although the particular types of reference workloads may depend on the intended use of the storage system. Multiple workload types may be evaluated to create sets of entries for the workload/CPU clock speed model 155, depending on the implementation. Likewise, although FIG. 4 shows some embodiments in which the workload types are based on the type of application traffic input to the storage system, the reference workloads can also be characterized based on features of the reference workload, such as the ratio of read to write IO, the percentage read hit, percentage write hit, etc. Although FIG. 4 shows some embodiments in which the example data structure is shown in the form of a table, it should be understood that other types of data structures may be used to correlate CPU clock speed with the maximum number of IOPS that a particular storage system is able to implement for a plurality of workload types.

In some embodiments, different storage systems have different characteristics, such as different numbers of CPUs 160 per storage engine 118, different numbers of storage engines 118, different numbers of storage arrays 130, and different numbers and types of back-end storage resources 132. Accordingly, in some embodiments the workload/CPU clock speed model 155 is trained specifically on each storage system. In other embodiments, a workload/CPU clock speed model 155 is previously created and provided to a given storage system. The pre-trained workload/CPU clock speed model 155 may then be adjusted over time based on the actual processing as necessary, to account for any differences between the storage system that was used to create the pre-trained workload/CPU clock speed model 155 and the storage system that is actually processing the workload from the host 102.

Figure 5:
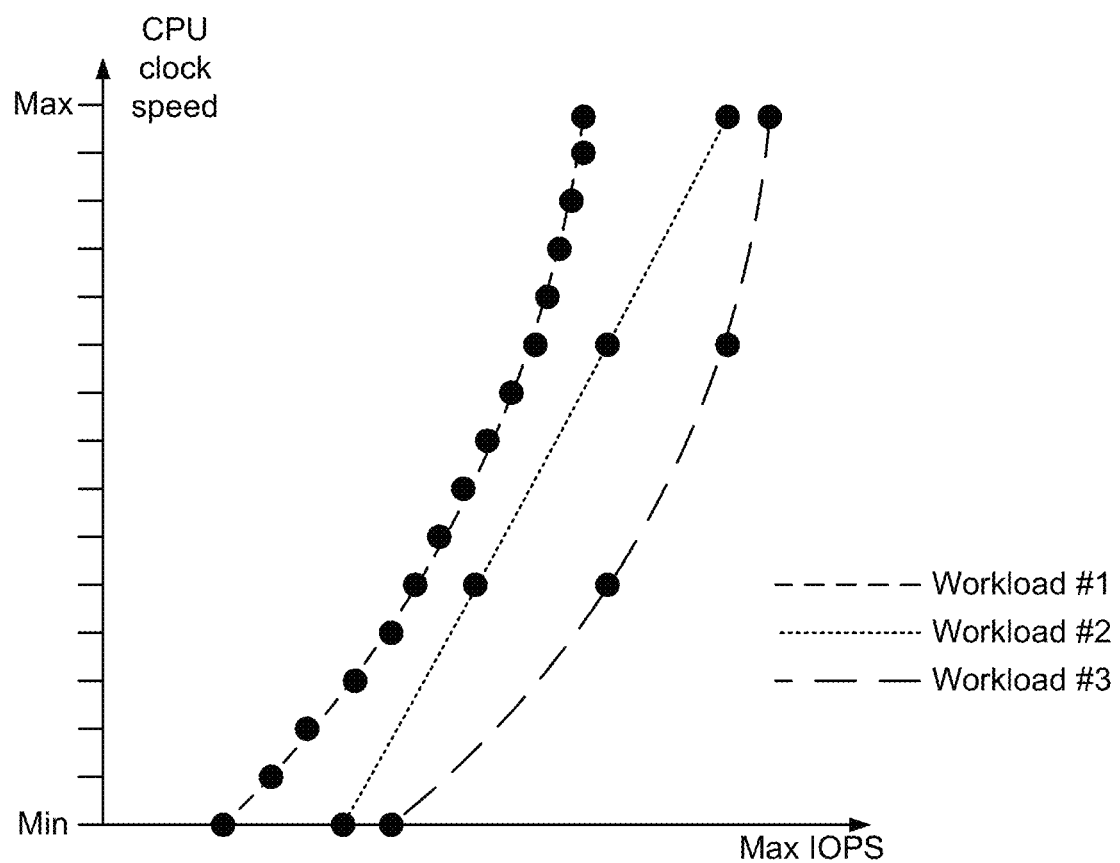
FIG. 5 is a graph showing several example hypothetical relationships between the maximum Input Output Operations per Second (IOPS) vs CPU clock speed for different workload types, according to some embodiments.

FIG. 5 is a graph showing several example hypothetical relationships between the maximum Input Output Operations per Second (IOPS) vs CPU clock speed for different workload types, according to some embodiments. As shown in FIG. 5, in some embodiments the workload/CPU clock speed model 155 is created to identify the maximum number of IOPS that a given storage system can implement for a range of CPU clock speeds. As shown in FIG. 5, in some embodiments a selection of CPU clock speeds is used to characterize the workload/IOPS curve for each workload type. In particular, FIG. 5 shows example workload curves for three different types of workloads (identified as Workload #1, Workload #2, and Workload #3). In FIG. 5, Workload #1 was evaluated (black dots) at each possible CPU speed step interval over the CPU clock speed range, whereas Workloads #2 and #3 were evaluated (black dots) at four selected CPU speeds within the CPU clock speed range. The workload/IOPS curve for each evaluated workload type is then determined based on the evaluated CPU clock speeds and the determined maximum number of IOPS that the storage system was able to process at the selected set of CPU clock speeds.

Figure 6:
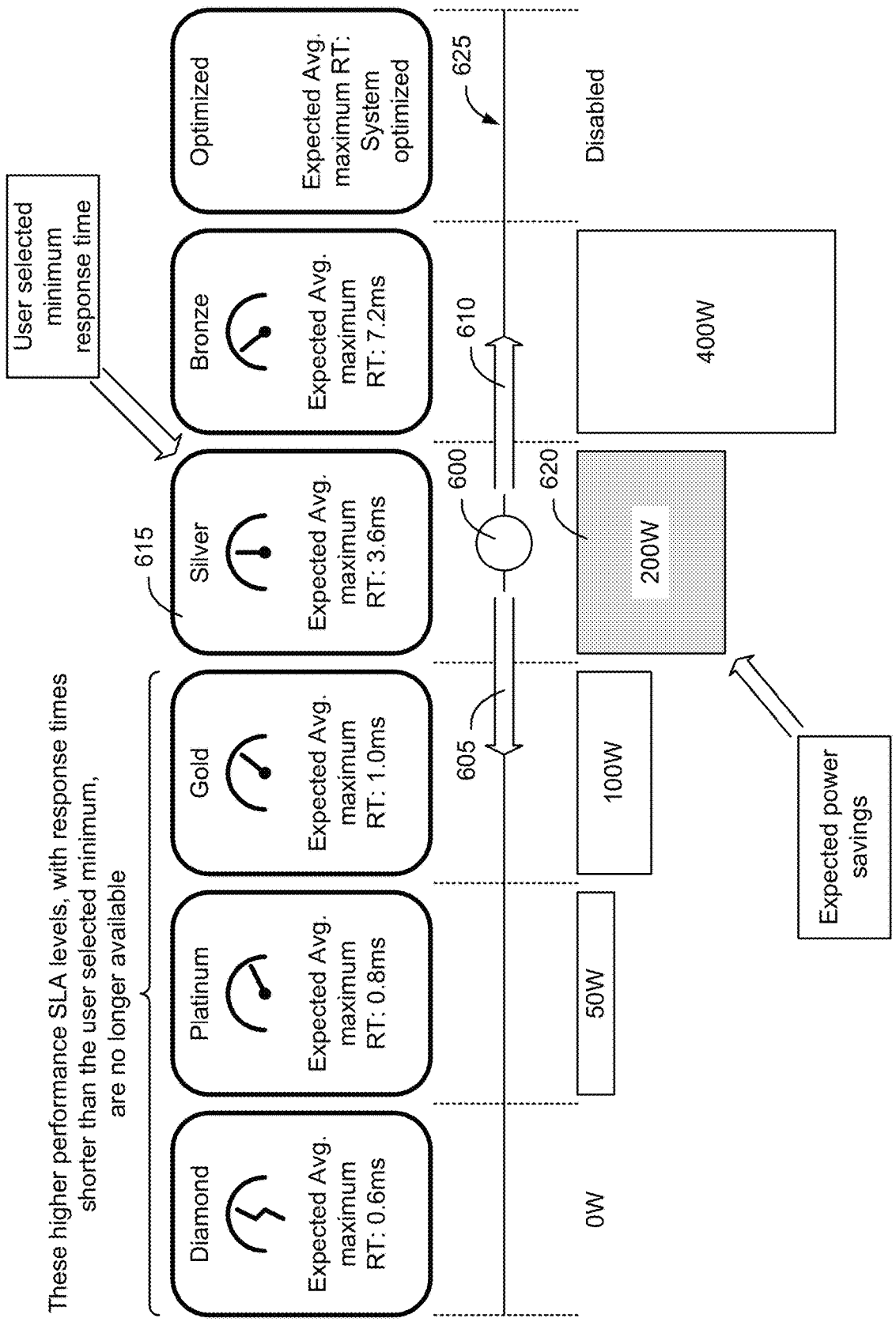
FIG. 6 is a block diagram of an example graphical user interface configured to be utilized in connection with a method and apparatus for enabling autonomous power control based on service level compliance, according to some embodiments.

FIG. 6 is a block diagram of an example graphical user interface configured to be utilized in connection with a method and apparatus for enabling autonomous power control based on service level compliance, according to some embodiments. As shown in FIG. 6, in some embodiments the graphical user interface includes a plurality of service level options that are user-selectable on the graphical user interface. Each service level option specifies the maximum amount of time that the storage system will take to respond to a given IO operation. For example, in FIG. 6 the service levels are labeled Diamond, Platinum, Gold, Silver, Bronze, and Optimized, and each service level is associated with an expected maximum average response time (RT).

Additionally, as shown in FIG. 6, in some embodiments the user interface includes a slider 600 that a user can drag left 605 or right 610 along a selection bar 625. When a user moves the slider 600 to a selected service level, the service level includes an expected maximum response time, as well as a power savings indication 620. The power savings, in some embodiments, is achieved by throttling the CPU clock speed to a level lower than the maximum CPU clock speed, and is associated with an expected minimum response time. In some embodiments, the minimum response time is congruent with the expected average maximum response time, such that the storage system is adjusted to meet the SLA associated with the selected maximum response time, but to not respond to IO operations significantly more quickly than the stated maximum response time. A user can select a service level associated with a desired expected average maximum response time and expected power savings. In response to selection of an SLA level lower than the maximum, the higher performance SLA levels, with response times shorter than the user-selected minimum response time, are no longer available. For example, in FIG. 6 the slider 600 has been moved to a region associated with the "Silver" SLA level, which has an expected average maximum response time of 3.6 ms. Selection of this SLA level is expected to result in a savings of 200 W of power, when compared with an amount of power it would take to perform the same amount of IOPS in the "Diamond" SLA level. As noted above, the power savings associated with selecting the "Silver" SLA level is achieved by reducing the CPU clock speed.

The particular CPU clock speed required to achieve the expected average maximum response time of 3.6 ms is determined from the workload type that will be provided to the storage system and the trained workload/CPU clock speed model 155. In some embodiments, once an initial CPU clock speed is selected from the CPU clock speed model 155, the storage system performance is monitored to ensure that the storage system is able to meet both its maximum response time, as well as the minimum response time. In response to a determination that the storage system is not meeting either the specified maximum response time or the specified minimum response time, the CPU clock speed is adjusted to ensure that the storage system meets both intended SLA parameters.

Although FIG. 6 shows some embodiments in which the maximum response time and minimum response time are congruent, it should be understood that in some embodiments the graphical user interface is configured to enable the user to independently specify both the maximum response time and the minimum response time.

Figure 7:
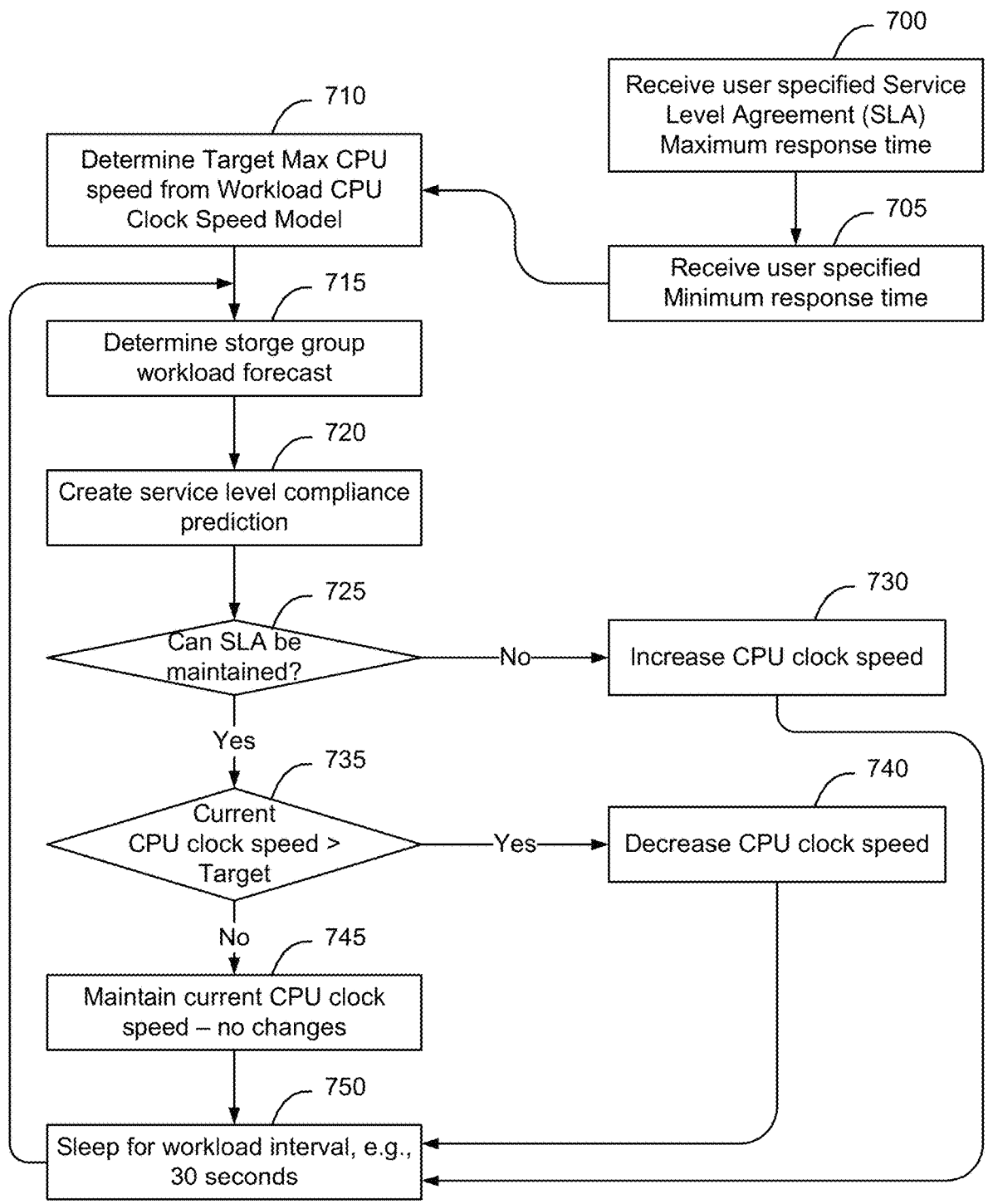
FIG. 7 is a flow chart of an example method of autonomous power control based on service level compliance, according to some embodiments.

FIG. 7 is a flow chart of an example method of autonomous power control based on service level compliance, according to some embodiments. As shown in FIG. 7, in some embodiments the CPU clock speed adjustment engine 165 receives the user-specified Service Level Agreement (SLA) Maximum response time (block 700). The maximum response time is a conventional parameter that is normally set on a storage system, and specifies the maximum amount of time that the storage system may take to respond to IO operations. In addition, the CPU clock speed adjustment engine 165 receives a user-specified minimum response time (block 705). The user-specified minimum response time, in some embodiments, specifies that the storage system should be physically configured to reduce energy usage by reducing the CPU clock speed to a lower level than the maximum possible CPU clock speed. By physically configuring the storage system to reduce the CPU clock speed, the user-specified minimum response time is able to be used to reduce the maximum responsiveness of the storage system and cause the CPUs of the storage system to consume less power than the CPUs would normally consume when operated at the maximum possible clock speed. Based on the user-specified minimum response time, the CPU clock speed adjustment engine 165 determines a target maximum CPU clock speed from the trained workload/CPU clock speed model 155 (block 710).

A storage group workload forecast is then determined (block 715). Many methods of forecasting workload may be used in block 715 depending on the implementation. For example, the workload on the storage group during a previous interval or a rolling average of workload values on the storage group during a previous set of workload intervals may be used to forecast the workload for an upcoming workload interval. Other forecasting methods may be used as well, and these are simply two example workload forecasting methods.

Based on the forecast workload, the current CPU clock speed, and the maximum response time specified in block 700, a service level compliance prediction is created (block 720). In some embodiments, the storage group workload forecast and the current CPU clock speed is used to key into the trained workload/CPU clock speed model 155 to determine an expected storage system response time during an upcoming workload interval. The expected storage system response time is then compared with the user-specified SLA maximum response time to determine if the storage system is expected to be able to maintain the SLA maximum response time during the upcoming workload interval, given the current CPU clock speed (block 725). In response to a determination that the storage system is expected to not be able to maintain the SLA maximum response time during the upcoming workload interval (a determination of NO at block 725), the CPU clock speed is increased (block 730). In some embodiments, the CPU clock speed increase (block 730) is determined using the trained workload/CPU clock speed model 155, to identify a CPU clock speed required to implement the forecast workload for the upcoming workload interval. Alternatively, in some embodiments, the CPU clock speed increase (block 730) is one or more step increments within the CPU clock speed range.

In response to a determination that the storage system is expected to be able to maintain the SLA maximum response time during the upcoming workload interval (a determination of YES at block 725), a determination is made as to whether the current CPU clock speed is higher than the target maximum CPU clock speed determined in block 710 (block 735). In response to a determination that the current CPU clock speed is higher than the target maximum CPU clock speed (a determination of YES at block 735), the CPU clock speed is decreased (block 740). In response to a determination that the current CPU clock speed is not higher than the target maximum CPU clock speed (a determination of NO at block 735), no adjustment is made to the CPU clock speed and the current CPU clock speed is maintained (block 745).

The CPU clock speed that is determined in block 730, block 740, or block 745, is then applied to the CPU to set the CPU clock speed for a workload interval (block 750). In FIG. 7, an example workload interval of 30 seconds is identified. It should be understood that workload intervals of other durations may be used as well. In some embodiments, during the workload interval, the CPU clock speed adjustment engine 165 sleeps and, at the end of the workload interval, the CPU clock speed adjustment engine 165 returns to block 715 to create a workload forecast for the subsequent workload interval, create a service level compliance prediction (block 720) and adjust the CPU clock speed for the next upcoming workload interval (blocks 725-745).

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated. The term "about" is used to indicate that a value includes the standard level of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of enabling autonomous power control based on service level compliance, comprising:
   creating a workload/Central Processing Unit (CPU) clock speed model for a storage system correlating a maximum number of Input/Output Operations per Second (IOPS) the storage system is able to implement for each of a plurality of CPU clock speeds within a CPU clock speed range for each of a plurality of workload types;
   setting a maximum storage system response time for the storage system based on a service level agreement;
   setting a minimum storage system response time for the storage system;
   determining a target maximum CPU clock speed from the workload/CPU clock speed model based on an expected workload type and the minimum storage system response time;
   setting a current CPU clock speed of a set of one or more CPUs of the storage system based on the target maximum CPU clock speed;
   determining a workload forecast for an upcoming workload interval; and
   using the workload forecast and current CPU clock speed to determine, from the workload/CPU clock speed model, whether the storage system is expected to comply with the maximum storage system response time during the upcoming workload interval;
   in response to a determination that the storage system is forecast to exceed the maximum storage system response time during the upcoming workload interval, increasing the current CPU clock speed above the target maximum CPU clock speed for the upcoming workload interval; or
   in response to a determination that the storage system is not forecast to exceed the maximum storage system response time, determining if the current CPU clock speed is faster than the target maximum CPU clock speed, in response to a determination that the current CPU clock speed is faster than the target maximum CPU clock speed decreasing the CPU clock speed toward the target maximum CPU clock speed for the upcoming workload interval.

2. The method of claim 1, wherein in response to a determination that the current CPU clock speed is not faster than the target maximum CPU clock speed, making no adjustment to the current CPU clock speed for the upcoming workload interval.

3. The method of claim 1, wherein the set of one or more CPUs of the storage system are CPUs that are used to process Input/Output Operations on the storage system.

4. The method of claim 1, wherein the minimum storage system response time is based on a power savings target value for the storage system.

5. The method of claim 1, wherein the workload/Central Processing Unit (CPU) clock speed model is created specifically for the storage system.

6. The method of claim 5, wherein creating the workload/Central Processing Unit (CPU) clock speed model comprises serially applying a plurality of reference workloads to the storage system; and for each applied reference workload, varying the CPU clock speed to a set of selected CPU clock speeds within a CPU clock speed range, and determining a maximum number of IO operations per second (IOPS) that the storage system can process at each selected CPU clock speed.

7. The method of claim 6, further comprising, for each applied reference workload, measuring an energy consumption by the storage system when the storage system is processing the maximum number of IOPS at each selected CPU clock speed.

8. A system for enabling autonomous power control based on service level compliance, comprising:

one or more processors and one or more storage devices storing instructions that are operable, when executed by the one or more processors, to cause the one or more processors to perform operations comprising:

creating a workload/Central Processing Unit (CPU) clock speed model for a storage system correlating a maximum number of Input/Output Operations per Second (IOPS) the storage system is able to implement for each of a plurality of CPU clock speeds within a CPU clock speed range for each of a plurality of workload types;

setting a maximum storage system response time for the storage system based on a service level agreement;

setting a minimum storage system response time for the storage system;

determining a target maximum CPU clock speed from the workload/CPU clock speed model based on an expected workload type and the minimum storage system response time;

setting a current CPU clock speed of a set of one or more CPUs of the storage system based on the target maximum CPU clock speed;

determining a workload forecast for an upcoming workload interval; and using the workload forecast and current CPU clock speed to determine, from the workload/CPU clock speed model, whether the storage system is expected to comply with the maximum storage system response time during the upcoming workload interval;

in response to a determination that the storage system is forecast to exceed the maximum storage system response time during the upcoming workload interval, increasing the current CPU clock speed above the target maximum CPU clock speed for the upcoming workload interval; or in response to a determination that the storage system is not forecast to exceed the maximum storage system response time, determining if the current CPU clock speed is faster than the target maximum CPU clock speed, in response to a determination that the current CPU clock speed is faster than the target maximum CPU clock speed decreasing the CPU clock speed toward the target maximum CPU clock speed for the upcoming workload interval.

9. The system of claim 8, wherein in response to a determination that the current CPU clock speed is not faster than the target maximum CPU clock speed, making no adjustment to the current CPU clock speed for the upcoming workload interval.

10. The system of claim 8, wherein the set of one or more CPUs of the storage system are CPUs that are used to process Input/Output Operations on the storage system.

11. The system of claim 8, wherein the minimum storage system response time is based on a power savings target value for the storage system.

12. The system of claim 8, wherein the workload/Central Processing Unit (CPU) clock speed model is created specifically for the storage system.

13. The system of claim 12, wherein creating the workload/Central Processing Unit (CPU) clock speed model comprises serially applying a plurality of reference workloads to the storage system; and for each applied reference workload, varying the CPU clock speed to a set of selected CPU clock speeds within a CPU clock speed range, and determining a maximum number of IO operations per second (IOPS) that the storage system can process at each selected CPU clock speed.

14. The system of claim 13, further comprising, for each applied reference workload, measuring an energy consumption by the storage system when the storage system is processing the maximum number of IOPS at each selected CPU clock speed.

* * * * *